(12) United States Patent
Akagi

(10) Patent No.: US 6,322,424 B1
(45) Date of Patent: Nov. 27, 2001

(54) ELECTROLYTIC INTEGRATED POLISHING METHOD FOR METAL WORKPIECES USING SPECIAL ABRASIVE MATERIALS

(75) Inventor: Kazuo Akagi, Shimonoseki (JP)

(73) Assignees: Nissin Unyu Kogyo Co., Ltd., Shimonoseki; Nippon Tokushu Kento Co., Ltd., Kyoto, both of (JP)

( * ) Notice: Subject to any disclaimer, the term of this patent is extended or adjusted under 35 U.S.C. 154(b) by 0 days.

(21) Appl. No.: 09/428,998

(22) Filed: Oct. 28, 1999

(30) Foreign Application Priority Data

Nov. 9, 1998 (JP) .................................. 10-318071

(51) Int. Cl.$^7$ ...................................... B24B 1/00
(52) U.S. Cl. .............................. 451/28; 451/51
(58) Field of Search ................. 451/51, 56, 61, 451/465, 463, 28; 51/332

(56) References Cited

U.S. PATENT DOCUMENTS

| | | | |
|---|---|---|---|
| 5,085,014 | * 2/1992 | Sandhof | 451/51 |
| 5,155,944 | * 10/1992 | Nagel et al. | 451/51 |
| 6,074,282 | * 6/2000 | Schimweg | 451/51 |
| 6,106,370 | * 8/2000 | Carter | 451/51 |

FOREIGN PATENT DOCUMENTS

| | | | |
|---|---|---|---|
| 0 452 501 A1 | 10/1991 | (EP) . | |
| 108960 | * 8/1917 | (GB) | 51/332 |
| WO 98/48968 | 11/1998 | (WO) . | |

OTHER PUBLICATIONS

Patent Abstracts of Japan, 09325215 A, Dec. 16, 1997, English Abstract.
Patent Abstracts of Japan, vol. 016, No. 258 (M–1264), Jun. 11, 1992 & JP 04 063628 A (Uta Seimitsu Kougiyou:Yuugen), Feb. 28, 1992, English Abstract.
Patent Abstracts of Japan, vol. 013, No. 170 (M–817), Apr. 21, 1989, & JP 01 005774 A (Komatsu LTD; Others:02) Jan. 10, 1989, English Abstract.
Patent Abstracts of Japan, vol. 012, No. 120 (M–685), Apr. 1988, & JP 62 246419 A (Kobe Stell LTD), Oct. 27, 1987. English Abstract.

\* cited by examiner

*Primary Examiner*—Joseph J. Hail, III
*Assistant Examiner*—Daniel Shanley
(74) *Attorney, Agent, or Firm*—Nixon Peabody LLP; David S. Safran

(57) ABSTRACT

Providing an electrolytic integrated polishing method for metal workpieces using a special abrasive material which leaves no residual abrasive grains on surfaces of soft metals such as aluminium, and the like, and allows high-precision abrasion for optimal surface treatments such as an anodized aluminium finish at the next process.

The electrolytic integrated polishing device performs rough abrasion and medium abrasion processes to the inner surface of an aluminium cylindrical workpiece by an elastic grindstone. Thereafter, the electrolytic integrated polishing device uses a sheet-form abrasive material for finishing abrasion. The sheet-form abrasive material is prepared by uniformly dispersing, short fibers including abrasive grains which is prepared by cutting an abrasion grains containing fiber into a specified length and synthetic fibers as a base material, processing them into a sheet, and hardening it with a thermosetting resin such as a polyurethane resin, an epoxy resin, and the like as an adhesive material. A plurality of these sheet-form abrasive materials are piled and are mounted on the holder through the aid of a spring plate for buckling prevention to compose the special abrasive material.

2 Claims, 2 Drawing Sheets

ELECTROLYTIC INTEGRATED POLISHING METHOD FOR METAL WORKPIECES USING SPECIAL ABRASIVE MATERIALS

The present invention relates to an electrolytic integrated polishing method for metal workpieces using a special abrasive material.

As mirror finishing methods for metallic surfaces, the prior art provides widely known conventional mechanical abrasion methods such as abrasion using a stationary grindstone, polishing using free abrasive grains, and buffing using non-woven fabric abrasive materials.

However, a mechanical abrasion using these abrasive materials causes abrasive grains to fall out of the abrasive materials during abrasion. Especially for soft metals such as aluminium, removed abrasive grains stick on a metal surface and remain there.

Accordingly, when a mirror-finished workpiece on a surface of which abrasive grains remain is further used for surface processing, for example, when a hard anodized aluminium finish is applied to a surface of an aluminium workpiece, as shown in FIG. 4 (A), a grain particle T remaining on the surface prevents development of an anodized aluminium layer A, causing more remarkable surface roughness after the hard anodized aluminium finish than surface roughness before the hard anodized aluminium finish. In other words, a value of the maximum height of the profile Ry (JIS B-0601:1994) becomes greater.

The anodized aluminium finish is used for improving a corrosion resistance and an abrasion resistance of aluminium products. An ordinary hard anodized aluminium finish develops a coating thickness of 25 to 30 $\mu$m. One third of this thickness corresponds to an anodic oxide film of aluminium as a base. The remainder, two thirds of the coating thickness, is a volume increase of a porous film in anodized aluminium.

For an aluminium alloy used for cylindrical workpieces such as a hydropneumatic cylinder, it is known that it is desirable to keep the surface roughness before finishing approximately 0.5 $\mu$mRy for appropriate anodized aluminium finishing in consideration for an uptake of the above-mentioned volume increase. When the anodized aluminium finish is applied to a clean surface whose roughness is approximately 0.5 $\mu$mRy before finishing, the finished surface provides the surface roughness of approximately 2.0 $\mu$mRy. This satisfies the surface roughness of 3.2 $\mu$mRy required for hydropneumatic cylinders after the anodized aluminium finish. Accordingly, it is important to finish a metal workpiece surface before the anodized aluminium finish so cleanly that the surface should leave no foreign substances such as residual abrasive grains.

Meanwhile, as means for finely abrading a surface of an extruded hollow aluminium article used for hydraulic cylinders, air cylinders, and the like, the inventors of this invention found an electrolytic integrated polishing technique for abrasive finishing composed of an elution action using electrolytic solutions and an abrasive action using abrasive materials and submitted the patent application (Japanese Patent Application No. Hei 9-325215) thereof. When conventional abrasive materials are used for finishing abrasion, however, we found a problem of undesirable surface roughness due to residual abrasive grains on the aluminium alloy in the hard anodized aluminium finish as a next process similarly to the aforesaid mechanical abrasion.

It is an object of the present invention to provide an electrolytic integrated polishing method for metal workpieces using a special abrasive material in order to eliminate residual abrasive grains from surfaces of soft metals such as the aluminium alloy, allow high-precision abrasion, and provide an optimal effect on the surface treatment at the next process such as the anodized aluminium finish.

In accomplishing this object, a subject matter of the present invention is to provide electrolytic integrated polishing using a sheet-form abrasive material which is prepared by uniformly dispersing short fibers including abrasive grains which is prepared by cutting an abrasive grains containing fiber into a specified length and synthetic fibers as a base material, processing them into a sheet, and hardening it with a thermosetting resin such as a polyurethane resin, an epoxy resin, and the like as an adhesive material.

The following describes a preferred embodiment of the present invention with reference to the accompanying drawings.

Figure 1:
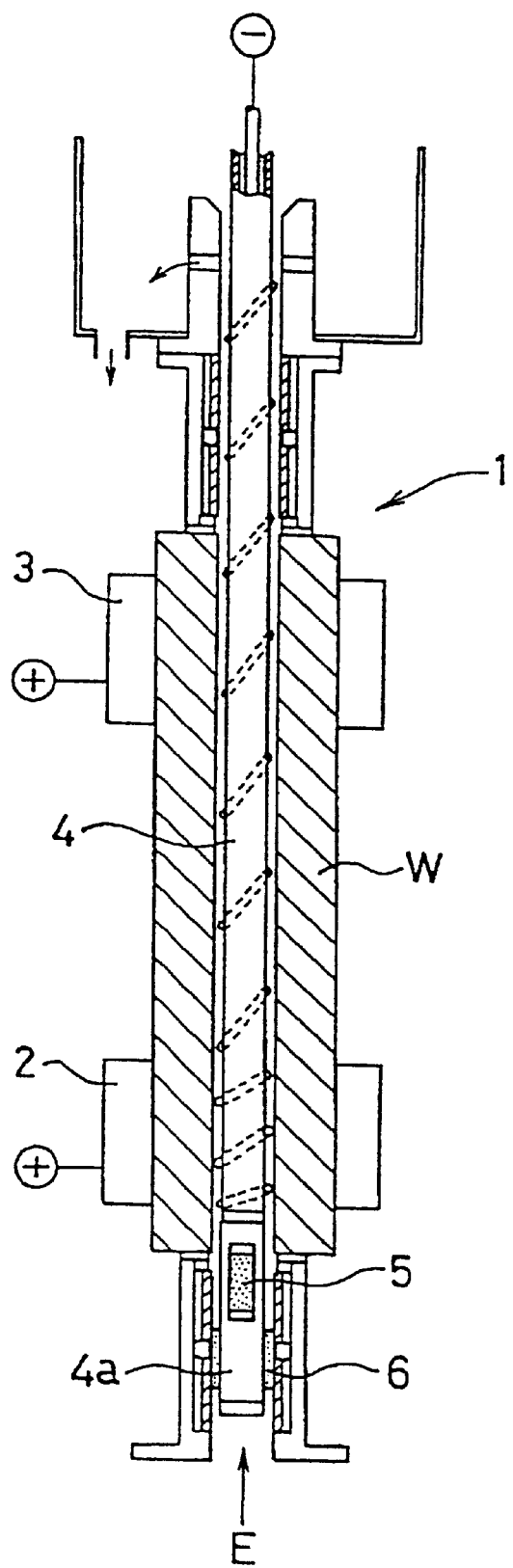
FIG. 1 is an explanatory drawing showing an arrangement of the electrolytic integrated polishing device for abrading a cylindrical workpiece.

FIG. 1 shows how a vertical electrolytic integrated polishing device 1 abrades an internal surface of an extruded hollow aluminium cylindrical workpiece W that is approximately 600 mm long. Support means 2 and 3 fix both ends of the said cylindrical workpiece W. Reference numeral 4 denotes a rotating shaft rotating in a high speed centered on an axis of rotation. A tool electrode 4a at the end of the rotating shaft is provided with a plurality of rough-abrasion grindstones 5 and medium-abrasion grindstones 6 alternately along a circumferential direction. The tool electrode 4a is charged negatively. At the same time, the said cylindrical workpiece W is charged positively. Electrolyte E is supplied from a side of the support means 2 into an inside of the cylindrical workpiece W. The rotating shaft 4 rotates centered on the axis of rotation and the tool electrode 4a is simultaneously moved from the side of the support means 2 to the side of the support means 3, constantly applying the electrolytic integrated polishing to the internal surface of the cylindrical workpiece W.

Elastic grindstones are used for the said rough-abrasion grindstones 5 and the said medium-abrasion grindstones 6. After rough and medium abrasions are applied to the internal surface of the cylindrical workpiece W, the finishing abrasion is conducted based on an electrolytic integrated method in order to achieve a specified surface roughness through use of #1500-grit to #2000-grit elastic grindstones (10 to 7.9 $\mu$m in grain diameters) or conventional non-woven fabric abrasive materials. Although the specified surface roughness is achieved after the abrasion, the next hard anodized aluminium finish process does not provide a specified surface roughness. As described above, this is because abrasive grains easily fall out of conventional elastic grindstones or non-woven fabric abrasive materials during abrasion. The removed abrasive grains stick on the internal surface of the cylindrical workpiece W and remain there. The residual abrasive grains prevent development of an anodized aluminium layer during the hard anodized aluminium finish and cause an undesirable surface roughness.

As shown in Table 1 below, the electrolytic integrated polishing using a #2000-grit elastic grindstone for the finishing abrasion results in the surface roughness of 0.76 to 0.92 μm. The electrolytic integrated polishing using conventional non-woven fabric abrasive materials results in the surface-roughness of 0.51 to 0.83 μm. After the abrasion, many fine protrusions remain on the entire inner surface of the cylindrical workpiece W. These protrusions show the size of approximately 10 μm and are mixed with angular powder substances whose size is approximately 2 to 3 μm. As an analysis result, Fe and Si are detected in these powder substances. Although the hard anodized aluminium finish is applied to this abrasive material, the required quality of 3.2 μm or less is not satisfied.

TABLE 1

| | Abrasive material type | Abrasion amount in external diameter (μm) | Surface roughness (μmRY) | |
| --- | --- | --- | --- | --- |
| | | | After electrolytic integrated polishing | After anodized aluminium finish |
| Rough abrasion | Elastic grind stone #100 | Total: 320 | — | — |
| Medium abrasion | Elastic grind stone #220 | 1.97 | — | |
| Finishing abrasion | Elastic grind stone #2000 | 10–15 | 0.76–0.92 | 4.2–7.0 |
| Finishing abrasion | Non-woven fabric #2000 | 1–2 | 0.51–0.83 | 4.5–6.3 |

The above-mentioned elastic grindstone is a polyvinyl alcohol bonded grindstone that uses a mixture of polyvinyl alcohol and thermosetting resin such as melamine resin and the like as a binding material for holding abrasive grains. This mixed binding material maintains an effective abrasion effect for the electrolytic integrated polishing and assures an appropriate separability of abrasive grains. Since the entire structure which holds abrasive grains is a three-dimensional porous grindstone, however, the porous grindstone shows a small elasticity as a whole and is consequently harder than a fibrous structure generally called a non-woven fabric, causing a remarkably effect of abrasive grains on metal surfaces. It will be readily understood that abrasive grains easily remain on metal surfaces.

The conventional non-woven fabric abrasive material is an abrasive material formed of abrasive grains and resins mainly aggregated in the vicinity of crosspoints of long-fibers by means of spraying a thermosetting resin material such as epoxy resin, phenolic resin, and the like as well as abrasive grains or by means of immersing a non-woven fabric in a solution which is a mixture of these resins and abrasive grains after processing a synthetic resin fiber such as commercially available Tetoron, Nylon, and the like into a non-woven fabric. When the said non-woven fabric abrasive material is used, an abrasion defect is easily occurred during abrasion processing due to an insufficient dispersion of abrasive grains, a large binding strength of abrasive grains, and the like, and a residual amount of abrasive grains on the cylindrical workpiece W is increased.

To solve this problem, the present invention uses a special sheet-form abrasive material for the finishing abrasion. This sheet-form abrasive material is prepared by uniformly dispersing short fibers including abrasive grains such as polyvinylalcohol fibers which include abrasive grains and are cut into 2 to 20 mm long and synthetic short fibers such as commercially available Tetoron, Nylon, and the like as a base material, processing them into a sheet, and hardening it with a thermosetting resin such as a polyurethane resin, an epoxy resin, and the like as an adhesive material.

In this case, abrasive grains are uniformly dispersed into polyvinylalcohol fibers and the polyvinylalcohol is used as a binding material for directly binding abrasive grains, thus providing such characteristics that abrasive grains act on a workpiece with a suitable elasticity during abrasion processing. Accordingly, the surface of the abraded workpiece shows extremely little abrasion defects and very small amounts of residual abrasive grains, which is advantageous in that the elastic grind stone used for the preceding process effectively eliminates residual abrasive grains from the surface and provides the continuous abrasion without clogging.

Figure 2:
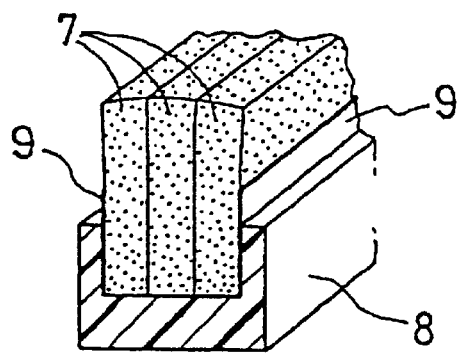
FIG. 2 is a perspective view of part of the sheet-form abrasive material mounted on the holder to be used for the method of the present invention.

As shown in FIG. 2, the said sheet-form abrasive material 7 is formed to a thickness of approximately 3 mm, a set of, for example, three sheets thereof is mounted on a holder 8, and a spring plate 9 of approximately 0.05 to 0.1 mm in thickness is inserted between the holder 8 and the sheet-form abrasive material 7 for absorbing a stress generated during the abrasion processing and preventing the sheet-form abrasive material 7 from buckling, thus providing the smooth, continuous abrasion.

Figure 3:
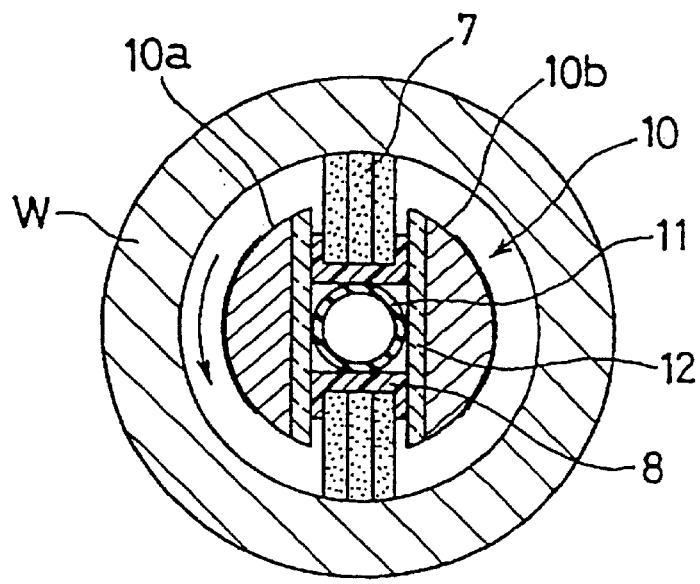
FIG. 3 is a transverse sectional view of major components of the electrolytic integrated polishing device to be used for finishing abrasion by means of the sheet-form abrasive material.

FIG. 3 shows a tool electrode using the sheet-form abrasive material 7 for finishing abrasion. This tool electrode is provided with a hollow electrode 10, which is provided with an opening, inside which the sheet-form abrasive material 7 coupled with the holder 8 is held in a radial direction so that the sheet-form abrasive material can slide freely. A hollow part of the tool electrode is provided with a pressurizing tube 11 which expands by means of an applied air and pushes the sheet-form abrasive material 7 in a radial direction to press the sheet-form abrasive material against the inner cylindrical surf ace of the cylindrical workpiece W at a given pressure. A hard glass 12 is attached to an opening wall of the said electrode 10 to decrease a frictional force against the holder 8 so that the sheet-form abrasive material 7 is pushed outward in accordance with the air pressure generated inside the pressurizing tube 11 and is pressed against the inner cylindrical surface of the cylindrical workpiece W.

When the said tool electrode is raised to introduce the sheet-form abrasive material 7 into the cylindrical part of the cylindrical workpiece W, the sheet-form abrasive material 7 is pressed against the inner surface and performs abrasion based on the following principle.

Namely, before the sheet-form abrasive material 7 starts abrasion while the electrode 10 rotates fast, a thin passivation coating is formed on the inner surface of the cylindrical part via a passivation coating generated and exposed surface 10a. The sheet-form abrasive material 7 then abrades the inner surface of the cylindrical part and removes this inviscid passivation coating to expose a metal base. Immediately thereafter, a concentrated elution exposed surface 10b allows an electrolytic current to be focused on a raised portion on the metal base f or providing selective electrolysis. This electrolytic integrated polishing is applied to the inner surface of the cylindrical part to smooth this inner surface until the tool electrode is raised inside the cylindrical workpiece W and is pulled out of the cylindrical part of the cylindrical workpiece W.

Performing the finishing abrasion using the #2000 sheet-form abrasive material 7 in this manner provides the surface roughness of 0.47 to 0.62 μm on the inner surface of the cylindrical workpiece W and the clean surface quality with no residual abrasive grains as shown in Table 2 below.

TABLE 2

| | | Abrasion amount in external diameter (μm) | Surface roughness (μmRY) | |
|---|---|---|---|---|
| | Abrasive material type | | After electrolytic integrated polishing | After anodized aluminium finish |
| Rough abrasion | Elastic grind stone #100 | Total: 320 | — | — |
| Medium abrasion | Elastic grind stone #220 | | 1.97 | — |
| Finishing abrasion | Sheet-form abrasive material #600 | 3–5 | 0.82–1.01 | — |
| Finishing abrasion | Sheet-form abrasive material #2000 | 1–2 | 0.47–0.62 | 1.89–2.01 |

Figure 4:
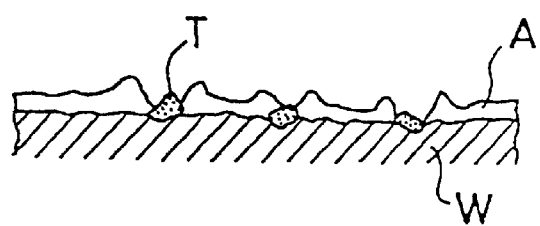
FIG. 4 shows resulting states of the anodized aluminium finish applied after abrasion in case of the prior art in FIG. 4 (A) and in case of the present invention in FIG. 4 (B).
Figure 4:
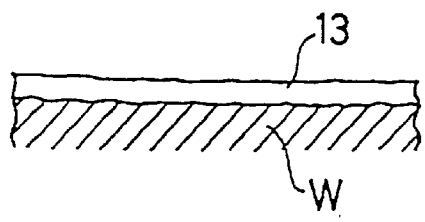

Thereafter, the hard anodized aluminium finish is applied to the cylindrical workpiece W. As shown in Table 2, the resulting surface roughness is 1.89 to 2.01 μm. This value is remarkably smaller than that for the finishing abrasion using the elastic grind stone (4.2 to 7.0 μm) and that for the finishing abrasion using the non-woven fabric (4.5 to 6.3 μm) as shown in the aforementioned Table 1. As shown in FIG. 4 (B), in addition, a hard anodized aluminium layer 13 is developed with an almost uniform thickness, fully satisfying the required quality. This is due to an effect that the sheet-form abrasive material 7 removes residual abrasive grains and the like by means of abrasion from the inner surface of the cylindrical workpiece W during stages of rough and medium abrasion processes.

It should be noted that, although the aforementioned embodiment explains the present invention using an example of abrading the inner surface of the cylindrical workpiece W, it is possible to widely apply a technique based on this invention to abrasion for an external surface of the cylindrical workpiece W, to abrasion for surfaces of workpieces of any form as well as cylindrical workpieces, and the like.

As set forth herein-above, the present invention makes it possible to conduct the finishing abrasion on workpiece surfaces through use of the electrolytic integrated polishing device by means of the sheet-form abrasive material that has characteristics of leaving no abrasive grains on metal surfaces, whereby providing an excellent surface quality with no surface defects in the anodized aluminium finish as the next process and other various surface treatments and providing remarkable effects especially when the invention is applied to soft metal materials such as aluminium products.

Reference Numerals

1 ELECTROLYTIC INTEGRATED POLISHING DEVICE
2, 3 SUPPORT MEANS
4 ROTATING SHAFT
5 ROUGH-ABRASION GRINDSTONE
6 MEDIUM-ABRASION GRINDSTONE
7 SHEET-FORM ABRASIVE MATERIAL
8 HOLDER
9 SPRING PLATE
10 ELECTRODE
11 PRESSURIZING TUBE
12 HARD GLASS
13 HARD ANODIZED ALUMINIUM LAYER

What is claimed is:

1. An electrolytic integrated polishing method for a metal workpiece comprising the steps of:

providing an abrasive base material having uniformly dispersed short fibers including abrasive grains that are prepared by cutting an abrasive grain containing fiber into a specified length and synthetic fibers;

processing said abrasive base material into a sheet;

hardening said sheet with a thermosetting resin adhesive material; and abrading a surface of the metal workpiece using said sheet, wherein said thermosetting resin is selected from the group consisting of polyurethane resin and epoxy resin.

2. A process of making an abrasive material for use in an electrolytic integrated polishing device, said method comprising the steps of:

uniformly dispersing short fibers including abrasive grains that are prepared by cutting an abrasive grain containing fiber into a specified length;

uniformly dispersing synthetic fibers as a base material;

processing the short fibers and the synthetic fibers into a sheet; and hardening said sheet with a thermosetting resin adhesive material, wherein said thermosetting resin is a polyurethane resin or an epoxy resin.

* * * * *